Figure 1:
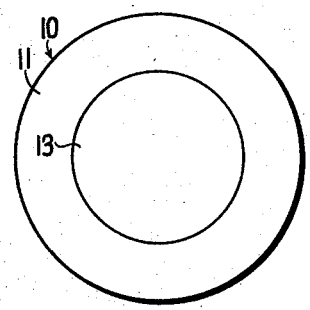

May 12, 1959  S. A. EMERSON  2,885,829
PROCESS OF MAKING A MULTIFOCAL LENS BLANK
Filed Nov. 8, 1952

INVENTOR.
Stanley A. Emerson
BY
ATTORNEY

United States Patent Office 2,885,829
Patented May 12, 1959

2,885,829
PROCESS OF MAKING A MULTIFOCAL LENS BLANK

Stanley Alfred Emerson, Dayton, Ohio

Application November 8, 1952, Serial No. 319,570

3 Claims. (Cl. 49—82.1)

My invention relates to improvements in the process of making a multifocal lens blank.

An object of the present invention is to provide a method of making a trifocal lens which allows great flexibility in minor field shape and power selection, and which, at the same time, provides a dividing line of desirable configuration between the two minor fields.

Another object of the present invention is to provide a method for making a trifocal lens which provides great flexibility in positioning the optical centers of inserted minor field segments.

A further object of the present invention is to provide a method of making a trifocal lens having a wide intermediate field which does not interfere with the distance field, with such lens, at the same time, having a dividing line of desirable configuration between the minor fields.

These advantages are obtained by my novel method of construction which comprises securing two overlapping buttons to a main blank of optical glass. The underlying button is compositely formed so that a portion of its area becomes essentially a portion of the main blank upon fusing the button to the blank. Another portion of this button is of different refractive index from that of the main blank to provide a minor field for the lens.

To provide a second minor field, a second composite button having an upper and lower portion, is then secured to the main blank. The refractive index of the upper portion of the second button is the same as the refractive index of that portion of the first mentioned button which provides the first mentioned minor field. Such upper portion of the second button is positioned so that all of its area overlaps part of the area of the minor field formed by the first button. Hence the upper portion of the second button can be fused to the first button at such overlapping portions which have the same refractive index.

The lower portion of the second button is in contact only with the main blank and is of a refractive index different from the refractive indices of the other portions of the lens. Such lower portion of the second button is thereby adapted to provide a second minor field for the lens having uniform power throughout its area. This second minor field is of different power from that of the first mentioned minor field due to the fact that the two fields have different refractive indices.

Each of the two buttons is provided with a curved rear surface that registers with a corresponding curved surface on the main blank. The two buttons are positioned on the main blank in lapped relationship so that the rear surfaces intersect. I control the position of such intersection by grinding the second countersink surface down into the main blank and first button until such second countersink surface intersects the rear surface of the first button at some desired location on the lower portion of the first button. At the same time, the intersecting surfaces are preferably formed with the same radius of curvature so that such intersection necessarily appears at a straight line in a plan view of the finished lens.

Since said intersection appears as a straight line, it is possible to provide the overlying button with a simple straight line division between the upper and lower portions thereof, and to superimpose and align such division with the intersection of the surfaces when the overlying button is secured in place. To provide different powers for the respective minor fields, such fields are formed of glass having different refractive indices.

As the interfield delineation in the present lens occurs at the dividing line between the upper and lower portions of the overlying button, the area of the upper minor field, which is provided by the remaining part of the lower portion of the underlying button in combination with the upper portion of the overlying button, may be increased or decreased merely by varying the location of the second countersink surface and by correspondingly varying the position of the dividing line on the overlying button and also by varying the diameters of the first and second countersink surfaces. Such variations in field area are possible because the upper portion of the overlying button is of the same refractive index as the minor field formed by the underlying button, and because both the buttons have rear surfaces of the same radius of curvature.

Further objects and advantages of the present invention will be apparent from the following description, reference being had to the accompanying drawings wherein preferred forms of embodiments of the invention are clearly shown.

Figure 2:
Figure 3:
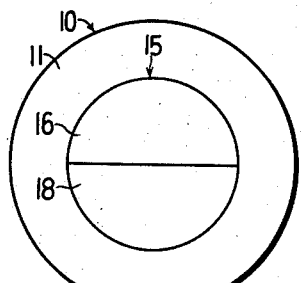
Figure 4:
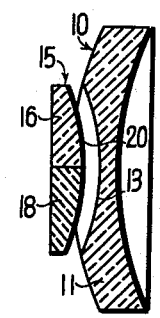
Figure 5:
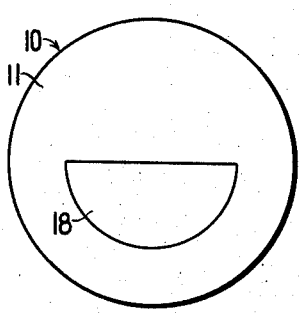
Figure 6:
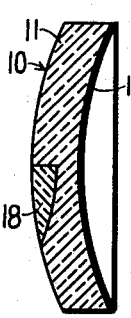
Figure 7:
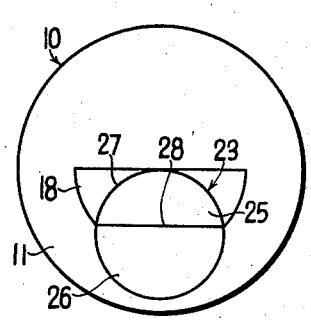
Figure 8:
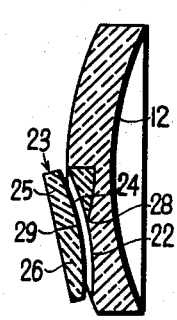
Figure 9:
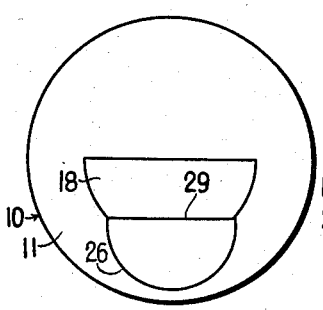
Figure 10:
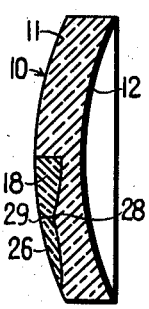

In the drawings:

Fig. 1 is a plan view of a main lens blank used in the present invention;
Fig. 2 is a vertical section corresponding to Fig. 1;
Fig. 3 is a second plan view of the blank of Fig. 1;
Fig. 4 is a vertical section corresponding to Fig. 3;
Fig. 5 is a third plan view of the blank of Fig. 1;
Fig. 6 is a vertical section corresponding to Fig. 5;
Fig. 7 is a fourth plan view of the blank of Fig. 1;
Fig. 8 is a vertical section corresponding to Fig. 7;
Fig. 9 is a fifth plan view of the blank of Fig. 1; and
Fig. 10 is a vertical section corresponding to Fig. 9.

Referring to the drawings and more particularly to Fig. 1, a main blank of optical glass is shown at 10. This blank is formed with a front surface 11 and a rear surface 12 as best seen in Fig. 2. The front surface is provided with a countersink portion which is formed by grinding and polishing a primary curved surface 13 into the front portion of the blank.

A button indicated generally at 15 is shown in Fig. 4. Such button is preferably formed of two portions. Upper portion 16 is formed of glass having the same refractive index as that of the main blank so that when the button 15 is fused to the main blank such upper portion 16 of the button 15 becomes essentially a portion of the main blank and is visually indistinguishable therefrom.

A curved rear surface 20 is formed on the rear portion of button 15 as shown in Fig. 4. The surface 20 is formed with a radius suitable for attaching such surface to the curved surface 13 which was ground into the front portion of the main blank. The curvature of the surface 13 is selected to provide the desired power for the minor field segment portion 18.

The button 15 is shown in fused relationship with the main blank in Fig. 6. The button 15 is also provided with a lower portion 18 which is formed of glass having a different refractive index from that of the main blank. It is part of this lower portion 18 of the button 15 that later serves as one of the minor optical fields in the finished lens. Fig. 5 is an elevational view showing the shape of the portion 18 after button 15 has been fused to the main blank, and after the front surface of the combined blank and button has been reground to prepare it for the second countersink surface.

After grinding off the surface stock of the button 15 and reducing the insert 18 to a predetermined shape and size by further grinding of the surface 11, a secondary curved surface 22 is then formed in the front portion of the main blank as shown in Fig. 8. A second composite button, indicated generally at 23, is provided with a curved surface 24 which is suitable for joining with the curved surface 22 on the main blank. This composite button 23 comprises an upper portion 25 of the same refractive index as that of the lower portion 18 of the first button 15 and a lower portion 26 of a different refractive index from the indices of the other elements of lens. This lower portion 26 of the second button provides the second minor field for the lens.

It should be noted that the curvature of the surface 22 for the second button is the same as the curvature of the surface 13 for the first button. Hence the two respective countersink curves will have an intersection 28 which necessarily appears as a straight line in the plan view of Fig. 7. A refractive index is selected for the lower portion 26 of the second button 23 to provide the desired power for the minor field formed by such button portion.

After the curved surface 22 has been formed on the main blank, but before the button 23 is secured thereto, a plan view of the lens will appear as seen in Fig. 7. After the button 23 is secured to the main blank, and after such blank is topsided, the lens will appear as seen in Figs. 9 and 10. It should be noted that the arcuate border portion 27 of the second countersink, shown in Fig. 7, is no longer apparent in Fig. 9 as such line disappears when the upper portion 25 of the overlying button 23 is fused to the lower portion 18 of the underlying button 15.

The interfield delineation in the present lens occurs at the junction 29 between the upper portion 25 and the lower portion 26 of the overlying button 23. This junction 29 appears as a horizontal line in Fig. 9. It should be noted that the interfield delineation 29 is superimposed over and aligned with the intersection 28 of the countersink curves as seen in Fig. 10. Thus it is seen that the area of the upper minor field, which is provided by the underlying button 15, may be varied merely by varying the location of the second countersink surface and by varying the position of the dividing line 29 on the overlying button 23. Such variation in field area is so easily obtained with the structure of the present invention due to the fact that the surfaces 13 and 22, which receive the buttons 15 and 23 respectively, are of the same radius of curvature, and hence the intersection 28 of the two surfaces will always appear as a straight line in the plan view of the lens.

If the surfaces 13 and 22 are not of the same curvature, then their intersection will not be a straight line in plan view but will be along a curve. In this case the upper and lower parts 25 and 26 of the button 23 must adjoin along a similar curve in order that it may be exactly superimposed on the line of intersection of the two surfaces.

While the form of embodiments of the present invention as herein disclosed constitute preferred forms, it is to be understood that other forms might be adopted, all coming within the scope of the claims which follow.

I claim:

1. The method of making a multifocal lens comprising the steps of forming a primary curved surface on a main lens blank; securing a button of optical glass of different index of refraction from the blank to said primary curved surface; forming a secondary curved surface on the blank and button intersecting the primary curved surface, with said primary and secondary surfaces having an intersection of certain plan view configuration; forming a second button comprising portions, of different indices of refraction, permanently united at a junction of the same plan view configuration as said intersection of said primary and secondary surfaces and having a curved surface substantially complementing the secondary surface; and securing said curved surface of the second button to the secondary surface of the blank and first button, with said junction being aligned with and superimposed over said intersection.

2. The method of making a multifocal lens comprising the steps of forming a primary curved surface on a main lens blank; securing a button of optical glass of different index of refraction from the blank to said primary curved surface; forming a secondary curved surface on the blank and button intersecting the primary curved surface, with said primary and secondary surfaces having an intersection of substantially straight line configuration in a plan view; forming a second button comprising portions, of different indices of refraction, permanently united at a junction of the same straight line configuration as said intersection of said primary and secondary surfaces and having a curved surface substantially complementing the secondary surface; and securing said curved surface of the second button to the secondary surface of the blank and first button, with said junction being aligned with and superimposed over said intersection.

3. The method of making a multifocal lens comprising the steps of forming a primary curved surface on a main lens blank; securing a first composite button of optical glass to said primary curved surface, said composite button having an upper portion of the same refractive index as that of the main blank and having a lower portion of refractive index different from that of the upper portion; forming a secondary curved surface on the main blank and button with said secondary surface intersecting the primary curved surface, with said primary and secondary surfaces having an intersection appearing as substantially a straight line in a plan view of the lens and with said intersection occurring on the lower portion of said composite button; and securing a second composite button to said secondary curved surface with the second button having an upper portion of the same refractive index as that of the lower portion of the first button, and a lower portion having a refractive index different from those of the other mentioned portions of the lens, with the upper and lower portions of the second button having a substantially straight line junction aligned with and superimposed over said intersection of the curved surfaces.

References Cited in the file of this patent

UNITED STATES PATENTS

| Re. 19,142 | Hancock | Apr. 24, 1934 |
| 1,158,102 | Bolde | Oct. 26, 1915 |
| 1,942,333 | Haussmann | Jan. 2, 1934 |
| 1,980,880 | Sachs | Nov. 13, 1934 |
| 1,995,680 | Laabs | Mar. 26, 1935 |
| 2,030,968 | Culver et al. | Feb. 18, 1936 |
| 2,033,573 | Hancock | Mar. 10, 1936 |
| 2,035,846 | Sterling | Mar. 31, 1936 |
| 2,049,094 | Tillyer | July 28, 1936 |
| 2,053,377 | Price | Sept. 8, 1936 |
| 2,071,616 | Culver et al. | Feb. 23, 1937 |
| 2,177,021 | Hammon | Oct. 24, 1939 |
| 2,177,022 | Hammon | Oct. 24, 1939 |
| 2,274,143 | Houchin | Feb. 24, 1942 |
| 2,405,826 | Hammon | Aug. 13, 1946 |
| 2,447,068 | Hammon | Aug. 17, 1948 |

FOREIGN PATENTS

| 440,438 | Great Britain | Dec. 30, 1935 |